US008000249B2

United States Patent
Nagy et al.

(10) Patent No.: US 8,000,249 B2
(45) Date of Patent: Aug. 16, 2011

(54) METHOD FOR IMPROVED CONGESTION DETECTION AND CONTROL IN A WIRELESS TELECOMMUNICATIONS SYSTEMS

(75) Inventors: Zoltan Nagy, Szeged (HU); Sandor Racz, Cegled (HU); Szilveszter Nadas, Budapest (HU); Peter Lundh, Skarholmen (SE)

(73) Assignee: Telefonaktiebolaget L M Ericsson (publ) (SE)

( * ) Notice: Subject to any disclaimer, the term of this patent is extended or adjusted under 35 U.S.C. 154(b) by 166 days.

(21) Appl. No.: 12/516,519

(22) PCT Filed: Nov. 28, 2006

(86) PCT No.: PCT/SE2006/050508
§ 371 (c)(1),
(2), (4) Date: May 27, 2009

(87) PCT Pub. No.: WO2008/066427
PCT Pub. Date: Jun. 5, 2008

(65) Prior Publication Data
US 2010/0067383 A1    Mar. 18, 2010

(51) Int. Cl.
*H04L 12/26* (2006.01)
(52) U.S. Cl. ........................................ 370/236; 370/310
(58) Field of Classification Search .......... 370/229–240, 370/252, 253, 310
See application file for complete search history.

(56) References Cited

U.S. PATENT DOCUMENTS

| | | | |
|---|---|---|---|
| 2002/0132607 A1 | 9/2002 | Castell et al. | |
| 2003/0156542 A1 | 8/2003 | Connor | |
| 2004/0032827 A1 | 2/2004 | Hill et al. | |
| 2004/0071086 A1* | 4/2004 | Haumont et al. | 370/230 |
| 2005/0239435 A1* | 10/2005 | Ikeda et al. | 455/403 |
| 2007/0015525 A1* | 1/2007 | Beming et al. | 455/509 |

FOREIGN PATENT DOCUMENTS

| | | |
|---|---|---|
| WO | WO 02/052886 A1 | 7/2002 |
| WO | WO 2006/071174 A1 | 7/2006 |

OTHER PUBLICATIONS

3GPP TR25.902 v6.0.0 Technical Specification Group Radio Access Network; Iub/Iur congestion control (Release 6) Sep. 2005.*
International Search Report dated Oct. 15, 2007 (4 pages).

* cited by examiner

*Primary Examiner* — Gary Mui
(74) *Attorney, Agent, or Firm* — Myers Bigel Sibley & Sajovec, PA

(57) ABSTRACT

The invention discloses a method for detecting and controlling traffic congestion in a wireless telecommunications system (100, 300, 400) comprising at least a first node (130, 330, 430) such as a Radio Base Station, and at least one second node (110, 310, 410) such as a Radio Network Controller, the system also comprising a Transport Network, TN (120, 320, 420), for conveying traffic between said first and second nodes, in which system (100, 300, 400) the traffic can comprise one or more flow. The method comprises the use of one flow control function (315, 415) per each of said flows, said one flow control function (315, 415) comprising a congestion detection and control function. In addition, the congestion detection function acts to reduce the traffic on said flow before the system becomes congested.

4 Claims, 4 Drawing Sheets

METHOD FOR IMPROVED CONGESTION DETECTION AND CONTROL IN A WIRELESS TELECOMMUNICATIONS SYSTEMS

TECHNICAL FIELD

The present invention discloses a method for detecting and remedying traffic congestion in a wireless telecommunications system with at least a first node such as a Radio Base Station, RBS, and at least a second node such as a Radio Network Controller, RNC. The system also has a Transport Network, TN, for conveying traffic between these two nodes.

BACKGROUND

In the 3G cellular telephony system known as WCDMA, Wideband Code Division Multiple Access, the system is divided into cells, and has a number of nodes known as Radio Base Stations, RBS, each of which monitors and controls traffic to and from one of the cells. The system also comprises a node "above" the RBSs, known as the Radio Network Controller, RNC, with one of the functions of the RNC being to monitor and control the RBSs.

The traffic from the RBSs to the RNC can be expressed as a number of flows. Accordingly, the system needs to comprise a function for monitoring and controlling the flows from the RBSs to the RNC. The purpose of this monitoring and controlling is, inter alia, to avoid congestion over the interface between the RBSs and the RNC, and also over the interface between the RNC's in the system.

Previously known such functions for monitoring and control of the traffic from the RBS to the RNC have been so called aggregated functions, i.e. they work on an aggregation of flows between the RBS and the RNC.

Aggregated control functions have a number of disadvantages, for example the following: Aggregated flow control solution can work well when all flows from the RBSs to the RNC encounter a common bottleneck. However, when different bottlenecks occur in the system, such as if the interface between RNC's becomes a bottleneck, an aggregated solution does not work particularly well.

SUMMARY

As explained above, there is a need for an improved control function in a cellular telephony system for the traffic between the RBSs and the RNC's. This need is addressed by the present invention in that it provides a method for detecting and controlling traffic congestion in a wireless telecommunications system, which comprises at least a first node such as a Radio Base Station, RBS, and at least a second node such as a Radio Network Controller, RNC, as well as a Transport Network, TN, for conveying traffic between the first and second nodes.

The traffic in the system can comprise one or more flows, and the method of the invention comprises the use of one flow control function per each of said controlled flows. The flow control function has a congestion detection and control function which acts to reduce the traffic on said flow before the system becomes congested.

Due to the fact that one control function is used per each flow, an improved control of the flows can be obtained, as compared to previous control methods. Also, since a system which uses the method of the invention can reduce traffic before the system is actually congested, smoother transitions and a more optimal use of the system can be obtained.

It should be pointed out that all flows in a system in which the invention is applied may not be controlled by a flow control function of the invention, depending on the specific application. Thus, the term "flow controlled flows" has been used above, to indicate this fact.

In one embodiment of the invention, the traffic reduction is initiated by the flow control function when a certain predefined percentage of a congestion state in the system is reached.

Preferably, the traffic reduction is initiated by means of a standardized data frame in the system.

The flow control function for one flow can be located either in the RBS or in the RNC, although co-location of the flow control function in both the RBS and the RNC is also possible.

The invention also discloses an RBS and an RNC which work according to the principles of the invention.

BRIEF DESCRIPTION OF THE DRAWINGS

The invention will be described in more detail in the following, with reference to the appended drawings, in which.

DETAILED DESCRIPTION

Figure 1:
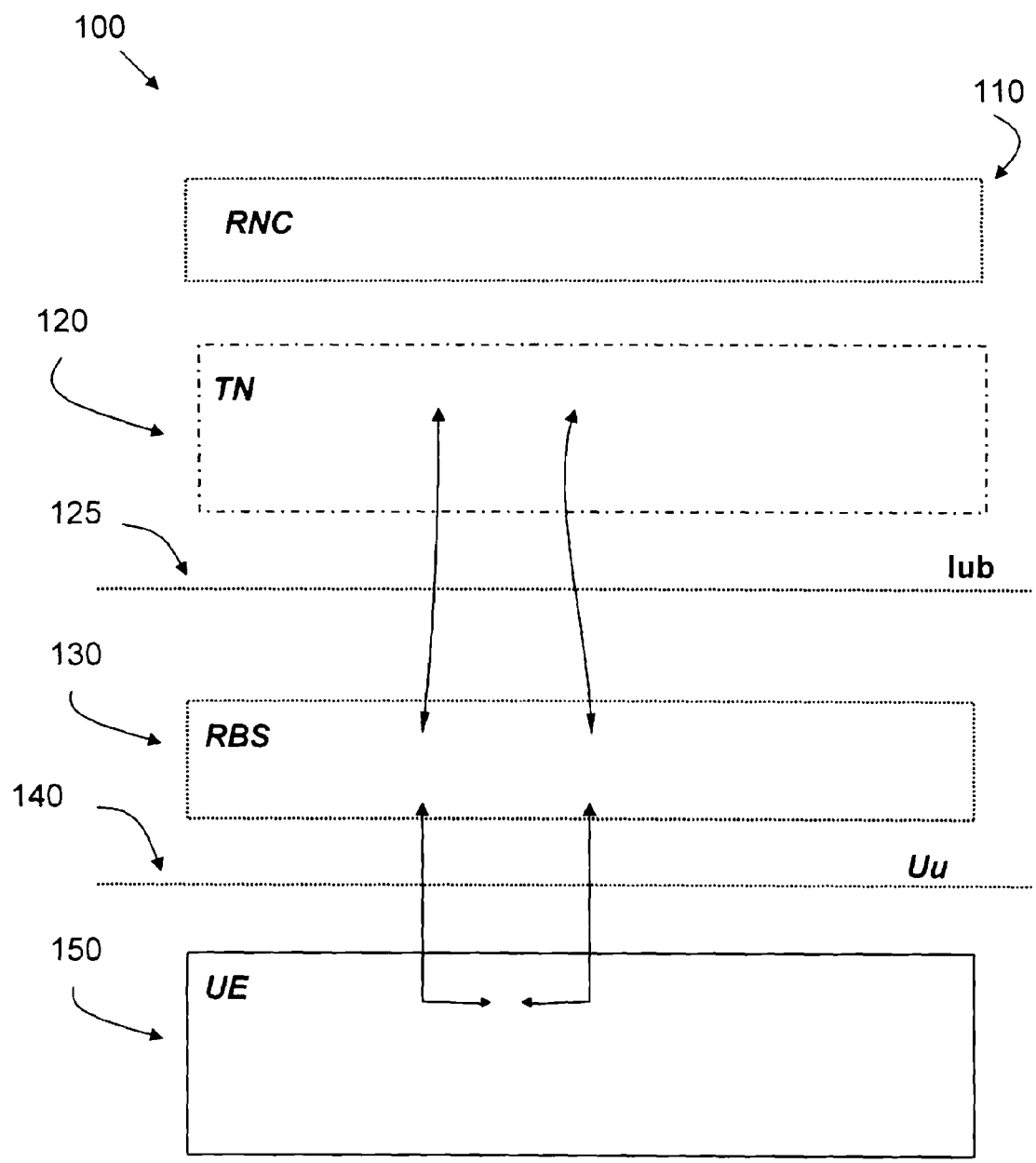
FIG. 1 shows a symbolic overview of a system in which the invention may be applied.

In FIG. 1, a system 100 is schematically shown in which the invention can be applied. The system 100 will be described below as being a cellular telephony system of the WCDMA type, but it should be understood that this is as an example only, the invention may be applied in other kinds of cellular telephony systems as well.

The system 100 comprises a number of so called cells, in which there may be a number of users, referred to as UE, User Equipment, shown as 150 in FIG. 1.

The system also comprises a number of nodes referred to as Radio Base Stations, RBS, shown as 130 in FIG. 1. One of the roles of the RBS 130 is that for each cell, one RBS 130 monitors and controls traffic to and from the UE's 150 in the cell.

The interface between the RBS 130 and the UE 150 is referred to as the Uu interface, shown as 140 in FIG. 1. As can be realized, the Uu interface 140 thus also becomes the interface for the UE's towards the rest of the system 100.

The system 100 also comprises a node on "the next level" as seen from the RBS 130, said node being the Radio Network Controller, RNC, shown as 110 in FIG. 1. One role of the RNC 110 is to carry out control of the RBS 130.

The interface between the RNC 110 and the RBS 130 is referred to as the Iub interface, shown as 125 in FIG. 1. Traffic between the RBS and the RNC is conveyed on a Transport Network, shown as 120 in FIG. 1.

Some acronyms which will be used in the following description of the invention will now be defined, in order to facilitate the understanding of the following description:

CA: Capacity Allocation, a frame sent from the RBS to the RNC, indicating available capacity.

E-DCH: Enhanced Dedicated Transport Channel

EUL: Enhanced Uplink, and refers to traffic in the up-link direction. EUL is also sometimes referred to as HSUPA, High Speed Uplink Packet Access. The term "down link" will also be used from now on to denote the traffic direction of the HSDPA traffic.

HSDPA: High Speed Downlink Packet Access.
HS-DSCH: High Speed Downlink Shared Channel
TCI: TNL Congestion Indicator
TN: Transport Network
TNL: Transport Network Layer With reference to FIG. 1, the system 100 needs to have some sort of control function for the traffic on the Iub interface. One of the tasks of such a control function is to detect and avoid congestion on the Iub interface.

The traffic on the system comprises so called flows. As has been mentioned previously, known control functions operate on aggregated such flows, which has a number of disadvantages. Thus, the present invention presents a flow control function which is per-flow, in other words the flow control function of the invention operates on one flow only, meaning naturally that there will be a number of such flow control functions which can (and will) be in operation simultaneously.

The flow control function of the invention can act on flows in either direction, i.e. either down link or up link. The flow control function can be located with one part in the RNC and one part in the RBS, but preferably it is located in either the RNC or in the RBS, with flow control functions for down link flows (HSDPA flow control) being located in the RBS, and flow control functions for up link flows (EUL flow control) being located in the RNC.

Conventionally, HSDPA and EUL flow control have detected congestion by detecting one of three events:

Gaps in the sequence number of Iub (both HS-DSCH and E-DCH) data frames. This can be carried out by means of the header of the Iub data frame which contains a four bit long sequence number field. The gap can occur when a full data frame is lost on the transport network.

Destroyed data frames. This is also caused by some loss on TN, although not a full Iub data frame, but only part of it. This is similar to frame loss, since the Iub framing protocol in the system may discard a whole Iub data frame if it detects destroyed data frames.

High dynamic delay, based on Delay Reference Time (DRT) sent from the RNC (or from the RBS in the case of EUL) in the header of the Iub data frame. This gives a reference time when the Iub data frame was sent from the RNC (or the RBS in the case of EUL). The DRT is compared to the reference time in the RBS (or the RNC in the case of EUL), which is the time when the Iub data frame arrived at the RBS or the RNC. If this delay is higher than a pre-defined limit, the event will be classed as congestion.

In many systems known today, the congestion detection system acts on any of the three events described above by reducing the bit rate of the congested traffic, in some systems by as much as 50%.

According to the invention, the per-flow control function introduces a concept which will be referred to in the following as "soft congestion". The concept is basically the same for the HSDPA and EUL flow controls, and has as a basic idea the fact that first two congestion events described above, i.e. gap or destroyed frame, are both caused by a data loss on transport network, while the third congestion event is not. High dynamic delay is a sign that the transport network buffer starts to increase, but does not cause data loss directly.

A basic idea behind the notion of soft congestion is that it will enable the flow control function to detect the beginning of congestion before the system actually becomes congested, which would cause gap or frame loss, or high frame delay. In addition, soft congestion as defined in this invention will provide smoother control by means of a smaller decrease rate, thus increasing Iub utilization, especially in case of few users in the system.

Detection of soft congestion will be based on a dynamic delay limit called "soft congestion limit", which will be described in more detail later.

As has been mentioned, the EUL flow control functions will usually be located in the RNC, and the HSDPA flow control functions will be located in the RBS. The output (if any) will be signalled in the following ways in the two cases:

EUL flow control: Signalled from the RNC to the RBS via a standard frame in the system known as the TCI frame (the acronym has been explained above). In known systems, two types of TCI's are defined: "TNL Congestion—detected by frame loss" and "TNL Congestion—detected by delay build-up", which refer to the loss and delay based congestions, respectively. The invention instead uses the first TCI for soft congestion, and the second TCI for "hard" or conventional congestion. In other words, the TCI of the type "TNL Congestion detected by frame loss" is used if the flow control function detects frame loss, destroyed frame congestion or "hard" dynamic delay. If the flow control function detects soft congestion, it instead sends "TNL Congestion—detected by delay build-up"

HSDPA flow control: via CA from the RBS to the RNC.

It should be noted that in most systems, in the case of HSDPA, CA's are sent periodically, while in the case of EUL, the TCI's are sent only when congestion occurs.

As has been mentioned, the flow control function of the invention is suitably located either in the RBS or in the RNC, depending on the direction in which the function is to control flows. Thus, flow control functions for down link flows (HSDPA flow control) are conveniently located in the RBS, and flow control functions for up link flows (EUL flow control) are preferably in the RNC.

However, it should be pointed out that the actual reduction or "shaping" of the altered bit rate is preferably located in the node from which the controlled traffic or flow is to be transmitted. This means that in the case of HSDPA flow control, the "shaping" function is preferably located in the RNC, and for EUL flow control, the "shaping" function is preferably located in the UE, if that is where the controlled flow originates from.

The flow control can thus in this way be seen to comprise an additional part, i.e. the "shaping" part.

A more detailed description of the soft congestion detection according to the invention is as follows, both for the HSDPA case and the EUL case:

The conventional and known dynamic delay congestion detection, called hard dynamic delay detection, measures the dynamic delay and compares it to a pre-defined limit. This limit is called "Iub data frame delay threshold", and can be, for example, 60 ms. If the measured dynamic limit is higher than this limit, the previously known flow control function treats this as a congestion event, and decreases the bit rate by a factor known as "the hard congestion reduction factor", which can be, for example, 50%.

The reduced bit rate will be sent to the RNC in the case of HSDPA via CA, which is also how the bit rate reduction is initiated in that case, with the CAs being sent periodically in the system, while in the case of EUL, an indication that the bit rate reduction is to be initiated is sent to the RBS via TCI frames. These TCIs are sent only when congestion occurs. How the bit rate reduction is actually carried out in the EUL case has been described above in connection with the "shaping" function, and will also be described in more detail in the following.

To differentiate the soft congestion detection from the previously known dynamic delay congestion detection, a new flow control parameter, called "the soft congestion threshold" is used. This threshold is a percentage value of the dynamic delay detection threshold called "Iub data frame delay threshold".

When the flow control function of the invention gets a new DRT, it calculates the dynamic delay, and then compares the dynamic delay to the Iub data frame delay threshold and to the soft congestion threshold multiplied by the Iub data frame delay threshold. Three outcomes are possible:

The dynamic delay is higher than the Iub data frame delay threshold. This is hard congestion.

The dynamic delay is between the Iub data frame delay threshold and the soft congestion threshold multiplied by the Iub data frame delay threshold. This is soft congestion.

The dynamic delay is smaller than the soft congestion threshold multiplied by the Iub data frame delay threshold. In this case, the flow control does not detect congestion.

Figure 2:
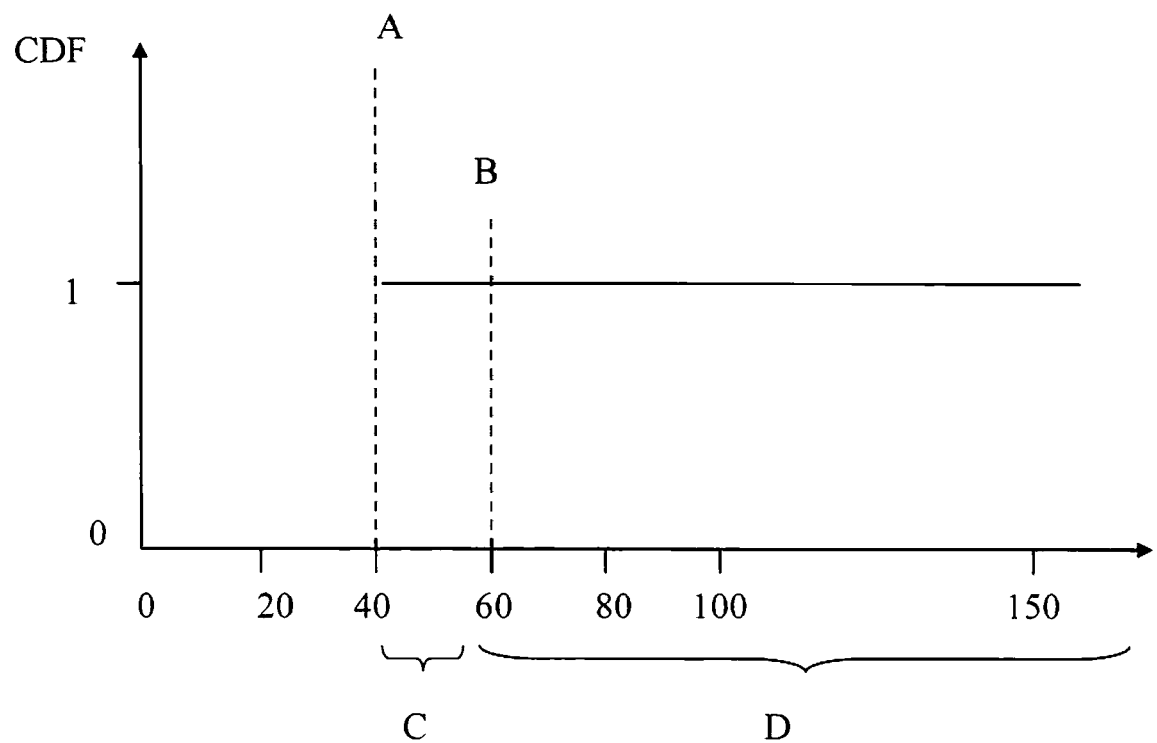
FIG. 2 shows some components according to the invention.

The definitions of soft and hard congestion can be realized by the help of FIG. 2 which shows a graph which is a cumulative distribution function, CDF as a function of the Iub Dynamic Delay in milliseconds. The soft congestion threshold multiplied by the Iub data frame delay threshold is shown as "A" in FIG. 2, and the Iub data frame delay threshold is shown as "B" in FIG. 2.

The values used in FIG. 2 are, by way of example, the following:

soft congestion threshold=66%
Iub data frame delay threshold=60 ms

A soft congestion bit rate reduction for dynamic delays between the soft congestion threshold multiplied by the Iub data frame delay threshold, i.e. 0.66*60 ms, and the Iub data frame delay threshold, i.e. 60 ms will always take place. This area is shown as "C" in FIG. 2

Hard congestion detection for dynamic delays above the Iub data frame delay threshold, i.e. 60 ms, will always take place. This area is shown as "D" in FIG. 2.

Assume, for example, that the measured dynamic delay is 72 ms. This is higher than the Iub data frame delay threshold, which is 60 ms. Therefore, the flow control function will treat it as hard congestion, and decreases the rate by 50 percent. On the other hand, if the dynamic delay is only 55 ms, which is between the soft congestion threshold, 66%, multiplied by the Iub data frame delay threshold, 60 ms, i.e. 0.66*60, and the Iub data frame delay threshold, 60 ms, then the flow control function will treat it as soft congestion, and will reduce the bit rate by, for example, 10 percent.

Finally if the dynamic delay is only 37 ms, the flow control function will ignore it, since it is below the soft congestion threshold, 66%, multiplied by the Iub data frame delay threshold, 60 ms.

The soft congestion detection bit rate reduction is determined by a parameter which is here referred to as the soft congestion reduction factor. This factor is made is significantly much smaller than the hard congestion reduction factor which is usually 50 percent; thus, the soft congestion can provide a smoother control of the bit rate.

Using "pseudo code", the flow control function can be expressed as follows:
Inputs:
Parameter: soft congestion threshold
Parameter: Iub data frame delay threshold
Parameter: soft congestion reduction factor
Parameter: hard congestion reduction factor
Variables
Variable: bit rate
Variable: dynamic delay
Output
Variable: bit rate
Algorithm
IF dynamic delay>Iub data frame delay threshold
    THEN bit rate=bit rate*hard congestion reduction factor
ELSE if dynamic delay>Iub data frame delay threshold*soft congestion threshold
    THEN bit rate=bit rate*soft congestion reduction factor
END The algorithm above can also be illustrated for the EUL flow control function by means of FIG. 3, which shows a system 300 in which the flow control function of the invention is used by the RNC 310 in order to control EUL flows from the RBS 330.

As input to the flow control function 315 in the RNC 310, the following is used:

$T_1$: Soft congestion threshold
$T_2$: Iub data frame delay threshold
Factor 2: Soft congestion reduction factor
Factor 3: Hard congestion reduction factor
BR: Bit rate
DD: Dynamic delay The output from the flow control function for the EUL, locate din the RNC 310 is an indication of the bit rate which may be used on the EUL, which is sent to the RNC 330 via the Transport Network 320, as so called TCI control frames, i.e. TNL CONGESTION INDICATION.

The TCI control frames of the system are:
"TNL Congestion—detected by frame loss"
"TNL Congestion—detected by delay build-up"
"No TNL Congestion"

In conventional systems, the first TCI frame refers to frame loss, the second refers to dynamic delay, and the third one indicates that there is no congestion. However, the known systems contain no TCI type for soft congestion. Therefore, the following solution is proposed according to the invention:

"TNL Congestion—detected by frame loss" is used by the flow control function in the case of frame loss, destroyed frame detection or dynamic delay detection.

"TNL Congestion—detected by delay build-up" is used to indicate soft congestion.

"No TNL Congestion" is not used, ignored by receiver nodes.

Figure 3:
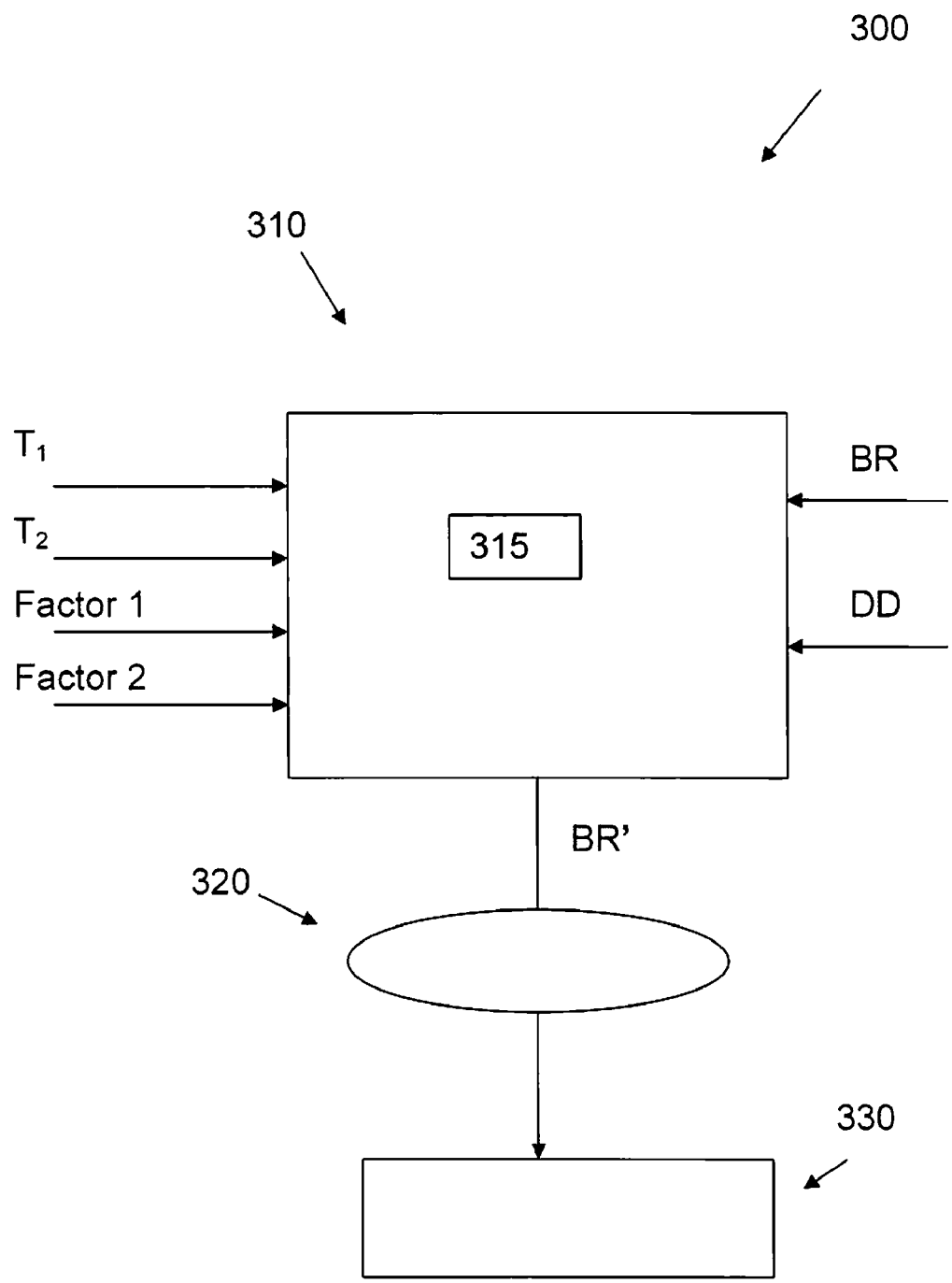
FIG. 3 shows a flowchart of the invention.

It should be pointed out that in the case of EUL flow control, as shown in FIG. 3, the RBS receives the signal for an initiation of the bit rate reduction (if any) from the flow control function in the RNC via the TCI frames, and calculates a corresponding bit rate, which it then send to the function in the RBS known as the EUL scheduler, which in turn handles that bit rate reduction over the air-interface by signalling to the UE.

Figure 4:
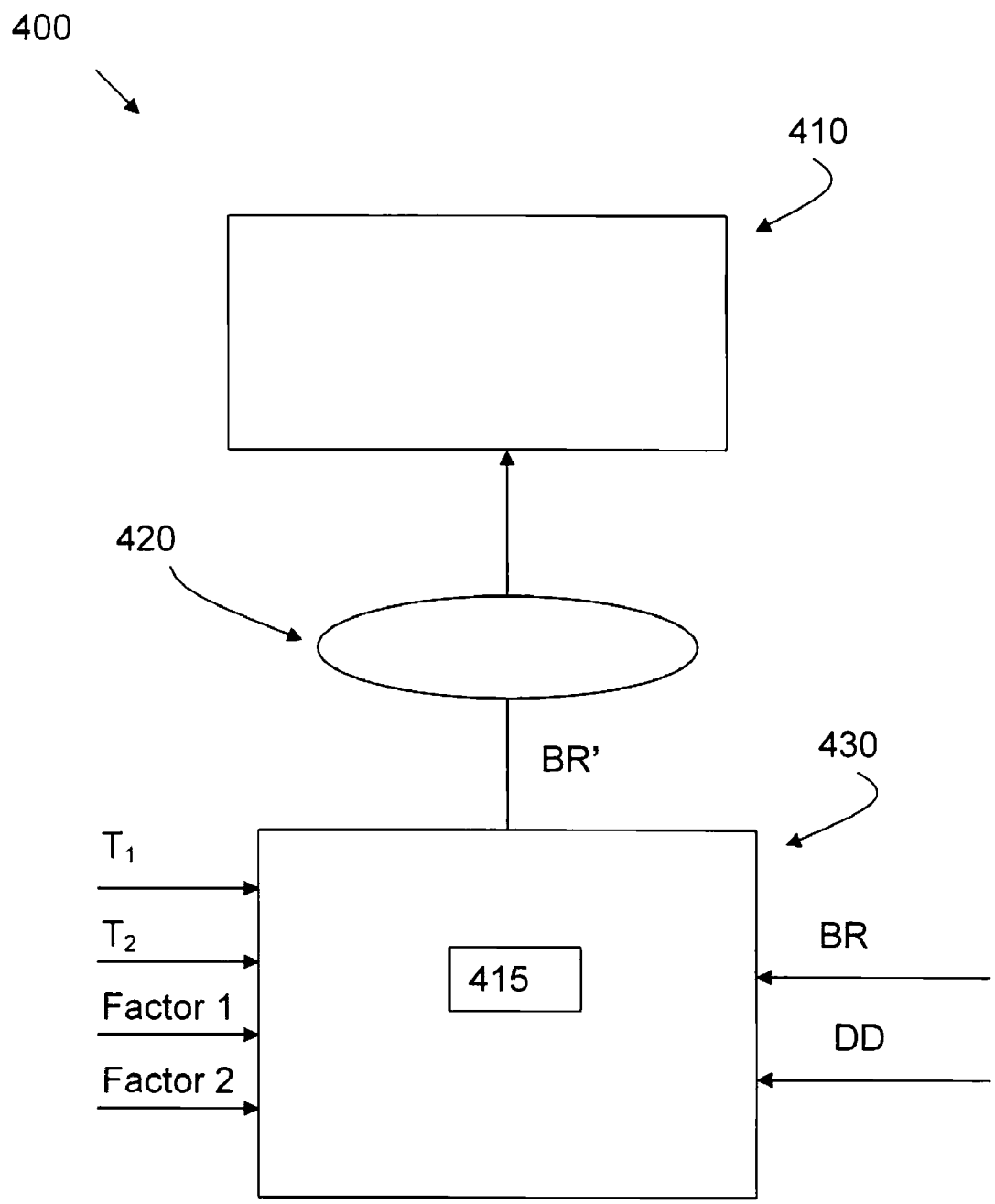
FIG. 4 shows another flowchart of the invention.

In the case of HSDPA flow control, the algorithm for the flow control function can be illustrated by means of FIG. 4, which shows a system 400 in which the flow control function of the invention is used by the RBS 330 in order to control HSDPA flows from the RNC 310.

The inputs to, and outputs from the flow control function 415 in the RBS 430 in the system 400 are the same as those in FIG. 3, and will thus not be repeated here again.

It should however be noted that the output from the flow control function in the HSDPA flow control case is in the form of so called CA control frames from the RBS 430 to the RNC 410 via the TN 420.

The invention claimed is:

1. A method for detecting and controlling traffic congestion in a wireless telecommunications system, said wireless telecommunications system comprising at least a first node including a Radio Base Station, RBS, and at least one second node including a Radio Network Controller, RNC, the wireless telecommunications system also comprising a Transport Network, TN, for conveying traffic between said first node and second node, in which wireless telecommunications system the traffic can comprise one or more flows, the method comprising:
- using one flow control function per each of said flows, said one flow control function comprising a congestion detection and control function, the congestion detection and control function acting to reduce the traffic on said flow; and
- initiating the congestion detection and control function for one of the controlled flows before the system becomes congested,
- where the one flow control function is located in the RNC and initiates the traffic reduction of the flow in response to Transport Network Layer Congestion Indication Frames, TCI, which are sent to the RBS by the RNC,
- where a TCI frame, which is previously defined as indicating congestion, is used to initiate traffic reduction before congestion occurs, and
- where three other types of congestion are indicated by the same TCI frame.

2. The method of claim 1, where traffic reduction is initiated by the flow control function when a certain predefined percentage of a congestion state in the wireless telecommunications system is reached.

3. A Radio Network Controller, RNC, for use in a wireless telecommunications system, in which wireless telecommunications system there is also a Radio Base Station, RBS, and a Transport Network, TN, for conveying traffic between the RBS and the RNC, in which wireless telecommunications system the traffic can comprise one or more flows, the RNC comprising:
- one flow control function per each of said flows, each of said one flow control function comprising a congestion detection and control function, which congestion detection and control function acting to reduce the traffic on said flow before the wireless telecommunications system becomes congested,
- where the traffic reduction is initiated by a standardized data frame in the wireless telecommunications system, which is sent to the RBS by the RNC,
- where the standardized data frame is a Transport Network Layer Congestion Indication frame, TCI,
- where a TCI frame, which is previously defined as indicating congestion, is used to initiate said traffic reduction before congestion occurs, and
- where three other types of congestion are indicated by the same TCI frame.

4. The RNC of claim 3, where said traffic reduction is initiated by the flow control function when a certain predefined percentage of a congestion state in the wireless telecommunications system is reached.

* * * * *